United States Patent
Morokhovskyi

(10) Patent No.: US 12,437,893 B2
(45) Date of Patent: Oct. 7, 2025

(54) METHOD AND SYSTEM FOR GOVERNING A PRESSURIZED WATER NUCLEAR REACTOR

(71) Applicant: FRAMATOME GmbH, Erlangen (DE)

(72) Inventor: Victor Morokhovskyi, Erlangen (DE)

(73) Assignee: FRAMATOME GmbH, Erlangen (DE)

( * ) Notice: Subject to any disclaimer, the term of this patent is extended or adjusted under 35 U.S.C. 154(b) by 107 days.

(21) Appl. No.: 17/608,136

(22) PCT Filed: May 7, 2019

(86) PCT No.: PCT/EP2019/061669
§ 371 (c)(1),
(2) Date: Nov. 1, 2021

(87) PCT Pub. No.: WO2020/224764
PCT Pub. Date: Nov. 12, 2020

(65) Prior Publication Data
US 2022/0246320 A1    Aug. 4, 2022

(51) Int. Cl.
*G21D 3/08*    (2006.01)
*G21D 3/00*    (2006.01)

(52) U.S. Cl.
CPC ............. *G21D 3/08* (2013.01); *G21D 3/001* (2013.01)

(58) Field of Classification Search
CPC .... G05B 13/023; G05B 13/026; G21D 3/001; G21D 3/08; G21D 3/10; G21D 3/12; G21D 3/16

(Continued)

(56) References Cited

U.S. PATENT DOCUMENTS 4,222,822 A    9/1980  Mueller et al.
4,240,874 A    12/1980 Millot
(Continued)

FOREIGN PATENT DOCUMENTS

CN    1043032 A    6/1990
CN    1282964 A    2/2001
(Continued)

OTHER PUBLICATIONS

Muniglia, Mathieu, Jean-Michel Do, and Sebastien Verel. "Design of a load following management for a PWR reactor using an optimization method." M&C 2017-International Conference on Mathematics & Computational Methods Applied to Nuclear Science & Engineering. 2017. (Year: 2017).*

(Continued)

*Primary Examiner* — Jack W Keith
*Assistant Examiner* — Jinney Kil
(74) *Attorney, Agent, or Firm* — Davidson Kappel LLC

(57) ABSTRACT

A method of governing a pressurized water nuclear reactor can simultaneously consider and balance a large number of control goals. The method includes iteratively considering a large number of randomly varied possible trajectories (Ta) of actuating variables for controlling reactor core reactivity for a future time interval. Each trajectory (Ta) of actuating variables is assigned a figure of merit (Σ) on the basis of a Value Table which contains weighting or penalty values for a number of events or adverse reactor core states which are characterized by preset conditions or values of the actuating variables, the process variables and/or variables derived from them. The trajectory (Ta) of actuating variables is chosen such that the figure of merit (Σ) has a local extremum, and corresponding actuators are moved accordingly.

8 Claims, 10 Drawing Sheets

* Predictor   ** Navigator   # only during initialization

(58) Field of Classification Search
USPC .................................................. 376/217, 241
See application file for complete search history.

(56) References Cited

U.S. PATENT DOCUMENTS

| | | | |
|---|---|---|---|
| 5,024,801 | A | 6/1991 | Impink, Jr. et al. |
| 5,158,738 | A | 10/1992 | Trouble et al. |
| 6,400,786 | B1 | 6/2002 | Mourlevat et al. |
| 6,862,329 | B1 | 3/2005 | Kropaczek et al. |
| 2003/0086520 | A1* | 5/2003 | Russell, II ............. G21D 3/001 376/259 |
| 2004/0122632 | A1 | 6/2004 | Kropaczek et al. |
| 2005/0089831 | A1 | 4/2005 | Russell et al. |
| 2008/0069288 | A1 | 3/2008 | Grossetete |
| 2008/0123794 | A1* | 5/2008 | Mertyurek ............... G21C 7/36 376/217 |
| 2008/0154838 | A1 | 6/2008 | Watford et al. |
| 2008/0219395 | A1 | 9/2008 | Pop et al. |
| 2012/0219101 | A1 | 8/2012 | Abbate et al. |
| 2013/0188765 | A1* | 7/2013 | Yoshida ................. G21D 3/001 376/217 |
| 2014/0152098 | A1 | 6/2014 | Hough |
| 2014/0314194 | A1 | 10/2014 | Martin et al. |
| 2016/0202670 | A1* | 7/2016 | Ansari ................. G05B 13/026 700/45 |
| 2016/0211037 | A1* | 7/2016 | Takado .................... G21D 3/16 |
| 2016/0329116 | A1* | 11/2016 | Grossetete ............... G21C 7/08 |
| 2016/0372222 | A1 | 12/2016 | Grossetete |
| 2022/0254532 | A1 | 8/2022 | Andre Poyaud et al. |

FOREIGN PATENT DOCUMENTS

| | | |
|---|---|---|
| CN | 1684203 A | 10/2005 |
| CN | 101079332 A | 11/2007 |
| CN | 101720489 A | 6/2010 |
| CN | 102667950 A | 9/2012 |
| CN | 103730176 A | 4/2014 |
| CN | 104115232 A | 10/2014 |
| CN | 104919677 A | 9/2015 |
| CN | 105431909 A | 3/2016 |
| CN | 107065556 A | 8/2017 |
| CN | 109416947 A | 3/2019 |
| DE | 102017205553 A1 | 3/2018 |
| GB | 1341131 A | 12/1973 |
| GB | 2122409 A | 1/1984 |
| JP | H02302695 A | 12/1990 |
| JP | S6363997 A | 12/1995 |
| JP | 2007232500 A | 9/2007 |
| JP | 2015145855 A | 8/2015 |
| JP | 2018084558 A | 5/2018 |
| RU | 2453938 C1 | 6/2012 |
| SE | 7807103 L | 12/1978 |

OTHER PUBLICATIONS

Zhao, Yuxin, et al. "A novel coordinated control for Integrated Pressurized Water Reactor." Annals of Nuclear Energy 85 (2015): 1029-1034. (Year: 2015).*
Wang, Pengfei, et al. "Control parameter optimization for AP1000 reactor using Particle Swarm Optimization." Annals of Nuclear Energy 87 (2016): 687-695. (Year: 2016).*
Eliasi, H., M. B. Menhaj, and H. Davilu. "Robust nonlinear model predictive control for nuclear power plants in load following operations with bounded xenon oscillations." Nuclear Engineering and Design 241.2 (2011): 533-543. (Year: 2011).*
Badgujar, Kushal D. "System science and control techniques for harnessing nuclear energy." Systems Science & Control Engineering 4.1 (2016): 138-164. (Year: 2016).*
Gang, Li. "Global control of H-infinity multimodel system with gap metric and self-stability for load-following nuclear reactor core." Nuclear Science and Engineering 180.2 (2015): 154-171. (Year: 2015).*
Kim, Jae Hwan, Soon Ho Park, and Man Gyun Na. "Design of a model predictive load-following controller by discrete optimization of control rod speed for PWRs." Annals of Nuclear Energy 71 (2014): 343-351. (Year: 2014).*
Corresponding Search Report and Written Opinion for PCT/EP2019/061669.
Edwards R M et al: Robust Optimal Control of Nuclear Reactors and POI4ER Plants, Nuclear Technology, American Nuclear Society, Chicago, IL, US vol. 98, No. 2, 1 May i992 (May 1, 1992), pp. 137-14.
Averyanova et al., Offset-Power Phase Diagram Method for Reactor Power Control, Atomic Energy, vol. 121, Issue 3, Sep. 2016 (in Russian, with English translation).
Averyanova et al., Development of VVER-1200/1300 Control Methods in the Daily Load Schedule, Atomic Energy, vol. 114, Issue 5, May 2013 (in Russian, with English translation).
Baskakov et al., Algorithm of Power Unit Operation With the Lap in Maintaining the Daily Power Balance Energosystems, Proceedings of the Odessa Polytechnic University 2007, vol. 2(28) (in Russian, with English translation).
IAEA Safety Guides, No. 50-SG-03, International Atomic Energy Agency, Vienna, 1979.

* cited by examiner

Value Table

| | |
|---|---|
| Step of P-bank | -1,00 € |
| Step of H-bank | -10,00 € |
| 1000 kg of boric acid | -1000,00 € |
| 1000 kg of demineralized water | -100,00 € |
| AO too large | According to AO Value Function |
| Non-uniform burn up 1 min | -10,00 € |
| Touching of Limits | According to Lim Value Function |
| Unable to return fast to 100% 1 min | -500,00 € |
| ........ Other Value Functions ........ | ±X € |
| Figure of Merit (overall price) | Σ |

FIG. 6

METHOD AND SYSTEM FOR GOVERNING A PRESSURIZED WATER NUCLEAR REACTOR

The present disclosure relates to a method of governing a pressurized water nuclear reactor, preferably within a nuclear power plant. It also relates to an according governance system.

BACKGROUND

A nuclear reactor is a complex nonlinear system having sophisticated dynamics in a wide time scale; comprehensive control of it is not trivial. Besides well-known control of thermal power and coolant temperature, reactor controllers take care of a plenty of other aspects as operational safety permitting operation only within given limits, uniforming of burnup, burnup compensation, compensation of the poisoning, uniforming of power density distribution, support of flexible electricity production, operation economy, etc.

Governing of nuclear reactors worldwide is currently based on control technology. However, conventional control technology used for this task reaches its applicability limits. Main difficulties of this approach are: trying to solve an inverse problem for a complex system, complex and long time-scale dynamics of reactor poisons and their spatial distribution, as well as a number of control goals which is significantly larger than the number of available actors.

SUMMARY

It is a therefore an objective of the present disclosure to provide a method of controlling or governing a pressurized water nuclear reactor and to provide an according governance system which can simultaneously consider and balance a large number of control goals. The method and the according system shall be easy to implement and setup for different kinds of existing or new nuclear reactors. They shall be capable of real-time control or governance.

A method for governing a pressurized water nuclear reactor is provided, the pressurized water nuclear reactor comprising a reactor core and a cooling circuit for the reactor core holding a reactor coolant, the reactor state being characterized by a number of measurable state variables, and the reactor core reactivity being controlled by a number of actuating variables and impacted by reactor poisoning, wherein for a given time-dependent trajectory of actuating variables according trajectories for the state variables are predicted on the basis of measured current values of the state variables, given or calculated poisoning values and a reactivity balance equation, the method comprising the step of iteratively considering a large number of randomly varied possible trajectories of the actuating variables for a future time interval, preferably much larger than one hour and typically having an order of magnitude of around 24 hours. wherein each trajectory of actuating variables is assigned a figure of merit on the basis of a Value Table which contains weighting or penalty values for a number of events or adverse reactor core states which are characterized by preset conditions or values of the actuating variables, the process variables and/or variables derived from them, wherein the trajectory of actuating variables is chosen such that the figure of merit has a local extremum, and wherein the actuators are moved or set accordingly.

Further embodiments and advancements of the method are specified in the subsequent description.

The method and the according device/system (nicknamed 'Core Governor') use computerized calculus of variations (i.e. looking for maxima and/or minima of a functional) instead of control technology. Unlike reactor controllers based on control technology the proposed Core Governor generates not only control commands in real time, it compiles also a comprehensive plan for control actions for the next large time span, preferably 24 hours and preferably visualizes it. Instead of solving the ambitious inverse problem, the Core Governor according to the present disclosure solves the trivial direct problem many times varying the plan for control actions in each iteration and looking for the best action plan using a figure of merit based on a given value table. Unlike control technology, computerized calculus of variations has no limitations for the number of control goals, since it cares about a single figure of merit which incorporates all goals simultaneously independent of their number and nature.

In a typical nuclear reactor, examples for such conflicting goals, which the present disclosure is capable to balance and optimize in an adequate manner, comprise:
Governance of axial offset (AO)
Minimizing of rod movements
Minimizing of boric acid consumption
Minimizing of demineralized water consumption
Burnup compensation
Uniform burnup
Additionally, the present disclosure may provide:
Long term, preferably 24 hours prediction and displaying of all the important core characteristics
Supervision and prediction of Xenon and Samarium poisoning
Monitoring and/or guarantee of the ability for fast power rise to 100%
Trivial adjustment for all possible changes, e.g. different loadings or core reconfigurations
Trivial parametrization
Applicability to all thinkable pressurized water nuclear power plant types
The corresponding advantages of this fundamentally novel approach relate to:
Safety
Availability
Maneuverability (flexible operation)
Planning efficiency
Transparency
Operability
Ergonomics
Predictability
This allows for a complete automation of grid services, including advanced load following control of the reactor core and other control regimes. However, semiautomatic or manual modes of reactor operation are also supported. In particular, the actuator movements can be performed manually, semi-automatic or fully automatic.

The proposed method needs and provides computer calculations much faster than real time. In a split of a second a series of preferably 24-hours trajectories should be calculated. The power of modern computers is enough for that since the proposed algorithm takes care only of the reactivity balance for preferably each e.g. 200 ms in the optimization time frame of preferably 24 hours. It needs simple arithmetic for this. The spatial distribution in the core is preferably considered in a 2-point model, since only the axial offset (AO) is of interest. A 2-point model is fully enough for the present purpose and needs very little computing power.

The proposed method can easily be adapted to different pressurized water nuclear power plants since the algorithm as such remains unmodified. In principle, only the parameters of the algorithm need to be updated. Since only direct problems will be solved, all these parameters are physical and well known for each reactor. In fact, most of these parameters are simply reactivity coefficients.

The behavior of the proposed governance algorithm can be modified simply by a modification of constant values and value functions in the Value Table. New features can be implanted simply by supplementation of the Value Table. Doing so, the figure of merit algorithm should also be supplemented. Since the figure of merit is a simple sum of different contributions, this supplementation is trivial.

BRIEF SUMMARY OF THE DRAWINGS

These and other aspects of the present disclosure and according advantages will be more readily apparent from the following sections in which exemplary embodiments of the present disclosure are discussed with reference to the accompanying drawings.

FIG. 6 shows an example Value Table for use in an algorithm running on the 'Core Governor' according to FIG. 2.

DETAILED DESCRIPTION

Figure 1:
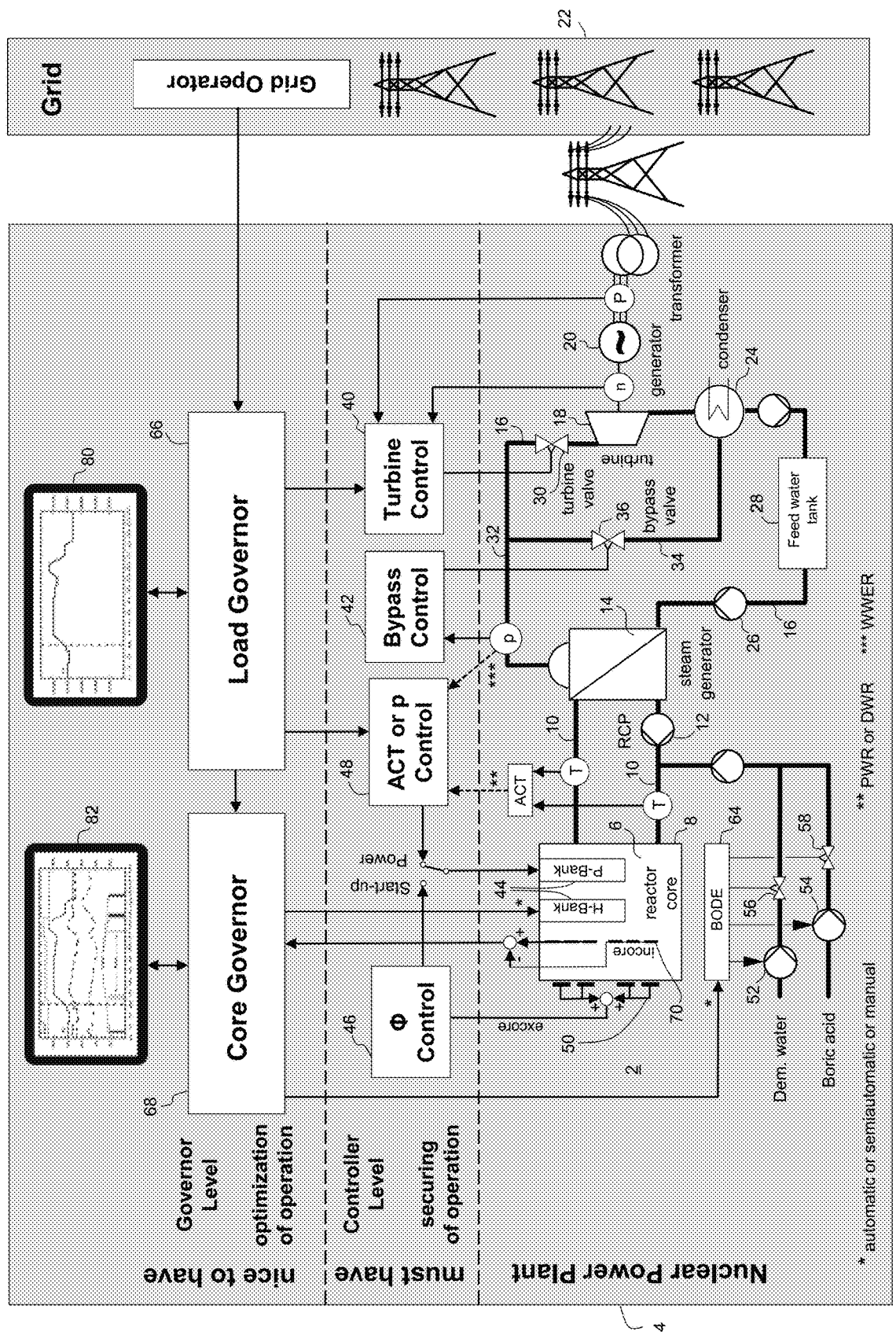
FIG. 1 provides a schematic overflow of a pressurized water nuclear reactor and its governing architecture according to the present disclosure.

FIG. 1 provides a simplified schematic overflow of a nuclear power plant 4 with a pressurized water reactor 2 and a governing architecture according to the present disclosure. The government architecture may also be called control architecture albeit reactor core government according to the present disclosure does not apply conventional classical control theory, as will be evident from the subsequent description.

In the example embodiment the nuclear power plant 4 comprises a pressurized water reactor (PWR) 2. It comprises a reactor core 6 with fissile nuclear material inside a reactor pressure vessel (RPV) 8. During operation nuclear heat within the reactor pressure vessel 8 is transferred to a primary cooling medium (or: coolant) circulating in a primary cooling circuit 10 under the driving force of a reactor coolant pump (RCP) 12. In the attached steam generator 14, the heat of the primary cooling medium is transferred to a secondary cooling medium circulating in a secondary cooling circuit 16, thereby evaporating the secondary cooling medium. The cooled primary cooling medium is then led again into the reactor core 6.

The thus produced live steam drives a steam turbine 18 which is coupled to an electrical generator 20, thereby generating electricity to be fed into an associated electrical power grid 22. Downstream to the steam turbine 18 the relaxed steam is condensed in a condenser 24 and then led again, as feedwater, to the steam generator 14 with the help of a feedwater pump 26. A feedwater tank 28 within the secondary cooling circuit 16 may act as a compensating reservoir.

The flow rate of steam entering the steam turbine 18 may be adjusted by the turbine valves 30 (only one which is shown here for the sake of simplicity—usually there are several of them in parallel) in the steam feed line 32. In some special cases (plant start-up, turbine trip, switching to house load operation, etc.) there is excess steam which does not enter the steam turbine 18, but is led directly to the condenser 24 via bypass line 34 which comprises a bypass valve 36 (only one is shown here for the sake of simplicity—usually there are several of them in parallel) for setting the bypass flow rate. The positions of the turbine valves 30 and the bypass valves 36 are controlled by an associated control system comprising a turbine controller 40 and a bypass controller 42. Measured parameters which enter into the control loops may comprise the live steam pressure p within the steam feed line 32, the rotational speed n of the steam turbine 18, and/or the electrical power P output by the electrical generator 20.

Governance of the reactor 2 is possible via a number of control rods 44 insertable into its core 6. Usually, the control rods in pressurized water reactors (PWR, DWR, WWER, etc.) are consolidated into control assemblies. The rods of a single assembly are driven by a single rod drive mechanism and move together within a single fuel assembly. In particular, four (PWR, DWR) or six (WWER) symmetrically located assemblies compose a control group. The groups are usually further consolidated into two banks. A smaller bank P (like Power) is used to control the reactor power, a large one H (like Heavy) is reserved for shut down of the reactor and is completely withdrawn from the active zone during the normal operation. In some advanced control concepts like German and French the H-bank is used also to rectify the power density distribution in the active zone. For this purpose, the H-bank is slightly inserted into the upper part of the active zone and can be slightly moved by a so-called power density axial offset (AO) controller. Besides the normal absorber rods some French reactors possess special 'grey rods'. The absorption ability of grey rods is less than that of normal (black) rods. Grey rods have only two operational positions: completely withdrawn or completely inserted and will be used for a reduction of the reactor power in large steps. In the exemplary embodiment shown in FIG. 1, one can see a P-bank and a H-bank.

Typically, an associated control system for the P-bank position comprises a neutron flux controller 46, also known as Φ-control, which is used for the reactor start-up, and an average coolant temperature (ACT) controller 48, responsible for power operation. Φ-control relies on measured values for the neutron flux Φ within the reactor core 6, typically measured by an ex-core instrumentation 50. ACT control relies on measured values for the temperature of the primary cooling medium, in particular an average coolant temperature (ACT) derived from the inflow temperature T1 and the outflow temperature T2 with respect to the reactor core 6. Unlike PWR and DWR, a WWER plant controls at this point the live steam pressure p instead of average reactor coolant temperature ACT. This fact however does not have any further impact on the government concept according to the present disclosure.

Furthermore, the reactivity within the reactor core 6 is affected by adjusting the concentration of boron in the primary cooling circuit 10. To this end, there is a feed system for boric acid on the one hand (increasing the boron concentration) and for demineralized water on the other hand (decreasing the boron concentration) attached to the primary cooling circuit 10, via the so-called volume control system (VCS) which for reasons of simplicity is not explicitly shown here.

The feed rates of boric acid and demineralized water, together also known as BODE, and thus the boron concentration in the primary cooling circuit 10 can be adjusted via according feed pumps 52, 54 and control valves 56, 58 in the BODE feed lines 60, 62. The feed pumps 52, 54 and the control valves 56, 58 are set by the BODE controller 64.

Figure 5:
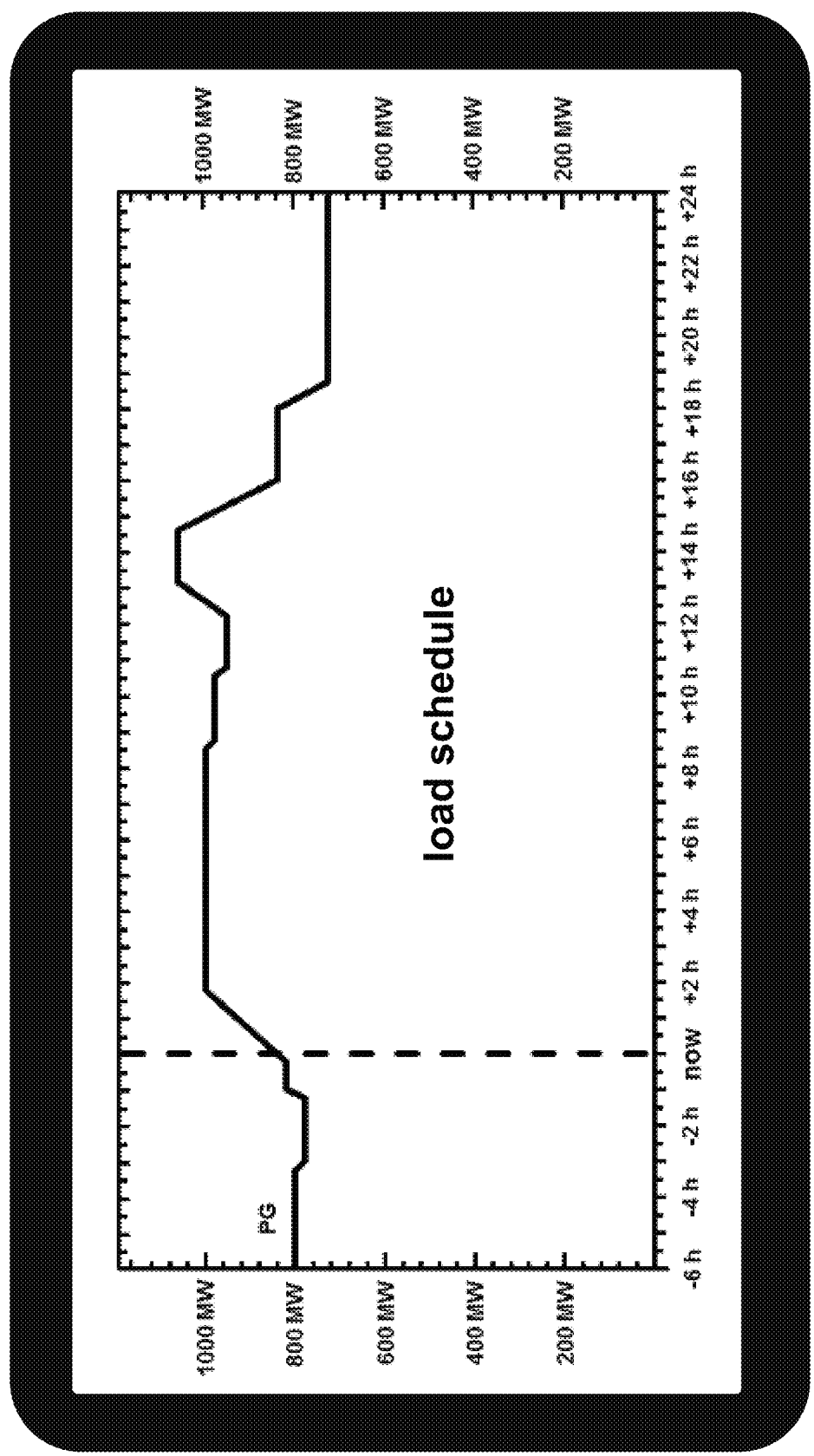
FIG. 5 is a diagrammatic view of a Load Schedule for a nuclear power plant.

In the exemplary embodiment of FIG. 1, a superior governance module, called Load Governor 66 receives a Load Schedule from the grid operator as visualized in the screen 80 and in FIG. 5, wherein a schedule of future electrical power demand is given as a function of time, usually for the next 24 hours with steps of usually 15 minutes. The nuclear power plant operator has a possibility to edit and to release this Load Schedule. Using the released Load Schedule, the Load Governor 66 provides the turbine controller 40 in real time with a set point for the electrical power. Furthermore, the Load Governor 66 performs a feed forward control of the P-bank via the ACT (or p) controller 48.

A related superior governance module, called Core Governor 68, receives the valid Load Schedule from the Load Governor 66 and the current power density from the in-core instrumentation 70. Using this Information and its own information on the current reactor poisoning and its spatial distribution, derived from the power history, the Core Governor 68 makes a prediction for all important core process variables for the future, preferably the next 24 hours, as explained below in further detail. These trajectories will be shown on the screen 82 of Core Governor 68. The origin points of these trajectories (t=0) give the current settings for the H-bank and for the BODE controller 64 acting on the BODE feed system as described above.

From a global perspective the state of the nuclear reactor 2 in the embodiment of FIG. 1 at a given time can be characterized by essentially three measurable and independent process variables or state variables:
 1. the fission power (PR),
 2. the reactor coolant temperature (ACT), or in case of WWER the live steam pressure (p), and
 3. the axial offset (AO) of the reactor core power density In particular, the fission power is the thermal power produced by fission reactions. It can be derived from the measured coolant temperature rise (difference between reactor coolant outlet and inlet temperatures) and known coolant flow rate on the one hand and from the neutron flux, measured by the incore neutron detectors on the other hand.

The average reactor coolant temperature ACT represents an average of reactor coolant inlet and outlet temperatures. Alternatively, in the case of WWER the live steam pressure p in the secondary cooling circuit 16 can be taken instead of the primary coolant temperature as an independent process variable.

The axial offset AO represents a normalized difference between the fission power of the upper and lower core halves. It will usually be measured by the incore neutron flux instrumentation. Nuclear power plants without incore instrumentation use the excore flux measurement for this purpose.

Figure 3:
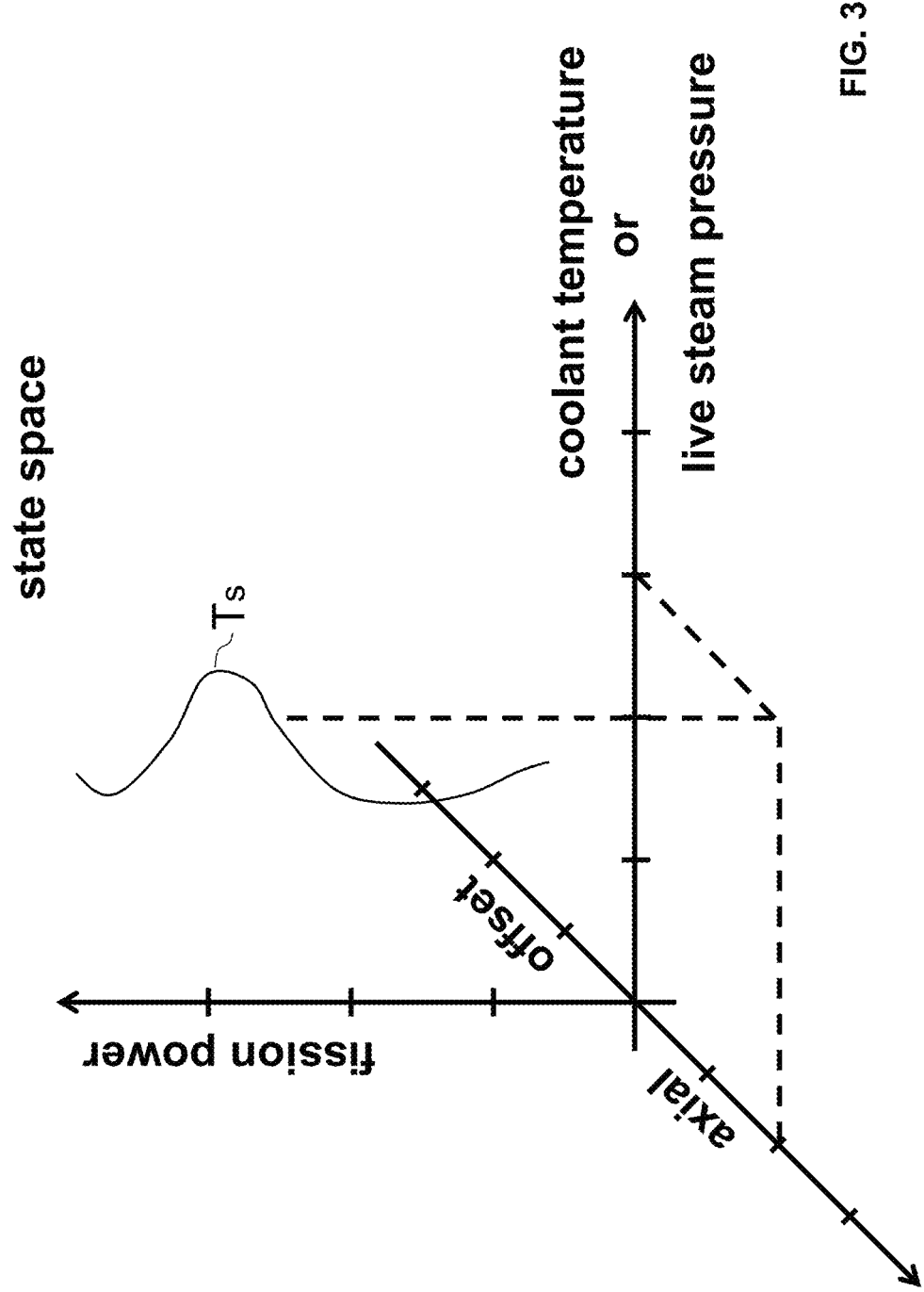
FIG. 3 is a visualization of a state space for a pressurized water nuclear reactor, spanned by state variables.

The state of the nuclear reactor 2 at a given time can therefore be represented by a point or state vector in a three-dimensional state space spanned by said state variables as visualized in FIG. 3. The temporal development of the state variables is then represented by a trajectory Ts in said state space. In other words, a trajectory Ts comprises the coordinates of the reactor state in the state space as a function of time.

Besides these three independent state variables the reactor poisoning and its spatial distribution in the core are important characteristics of the reactor core state giving significant contributions to the reactivity. Unlike fission power, coolant temperature and axial offset, the reactor poisoning cannot be directly controlled using the actuators—it rather results from the history of the core operation, mainly from the last 24 hours and should be obviously taken into account while controlling the reactor.

Similarly, there are three main actuating variables independently governing the state of the nuclear reactor 2 in the embodiment of FIG. 1:
 1. the P-bank position,
 2. the boron concentration in the primary cooling circuit 10, and possibly grey rods
 3. the H-bank position, if the reactor possesses a movable H-bank.

Some special French reactors possess additionally so-called grey rods having less absorption than normal (black) rods. Grey rods have only two possible positions: completely withdrawn or completely inserted. The advantage of grey rods is that they do not deform the axial power density distribution and thus do not change the axial offset (OA) in the reactor core, like boration/dilution. That is why grey rods can be considered together with boration/dilution as a single actuating variable.

The boron concentration can be adjusted by actuating the BODE feed pumps 52, 54 and control valves 56, 58 via the BODE controller 64 as described above.

Figure 4:
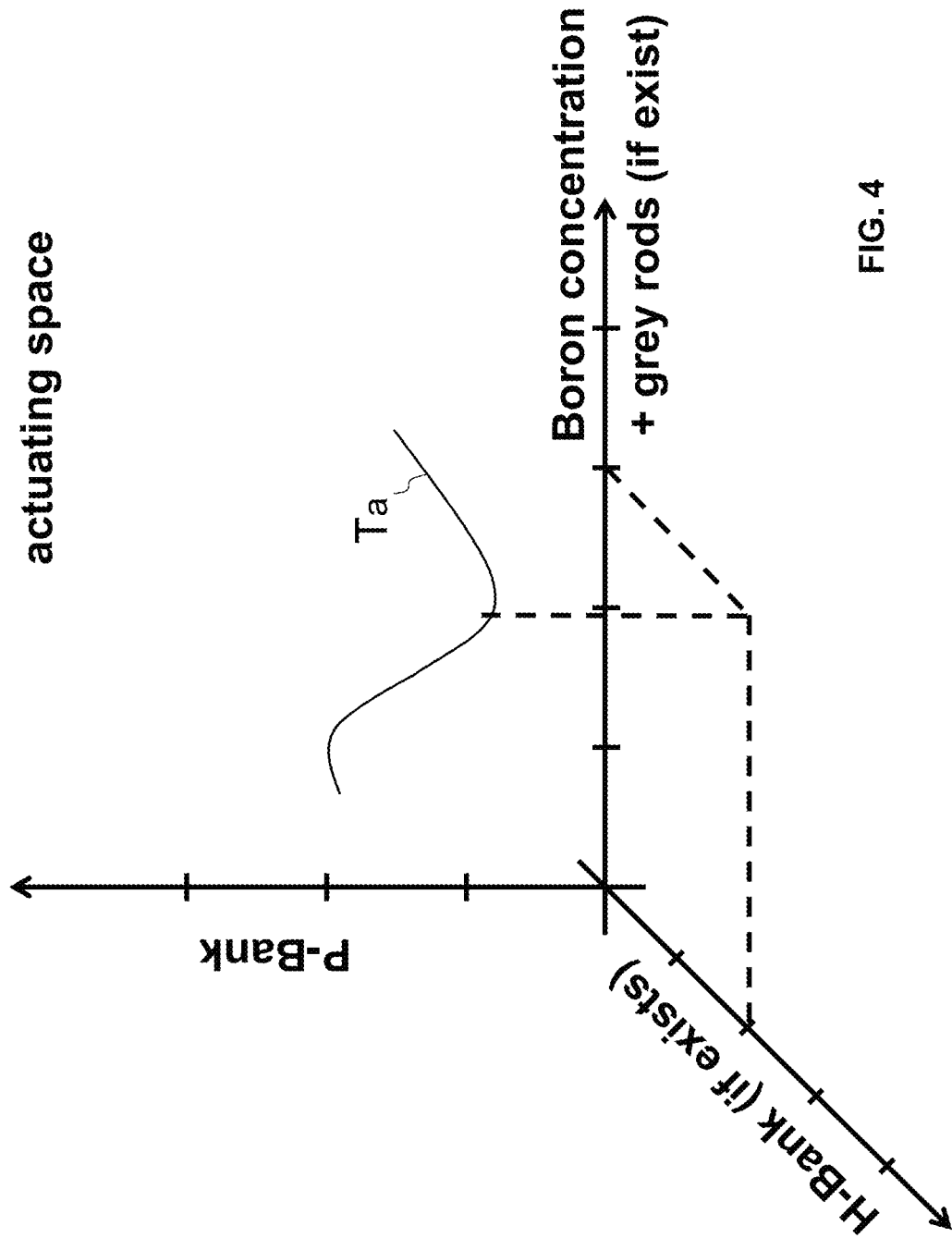
FIG. 4 is a visualization of an actuating space for a pressurized water nuclear reactor, spanned by actuating variables.

Hence, the current value of actuating variables can be represented by a point or vector in a three-dimensional space of actuating variables as visualized in FIG. 4. Similar to the above description of the state space, a trajectory Ta in this so-called actuating space represents the temporal development of the actuating variables.

At any given time, the actuating variables can, in principle, be set to arbitrary values within physically feasible margins. Hence, the trajectory Ta in the actuating space can be chosen freely and is only limited by the practicable maximum and minimum values of the actuation variables as well as by limits given by reactor protection and limitation systems.

The trajectory Ts in the state space, however, depends on the trajectory Ta of the actuating variables along with the current reactor poisoning and current heat removal by the secondary cooling circuit. Thus, the trajectory Ts 'automatically adjusts itself' due to the immanent reactor physics. Because of the intrinsic nonlinearity of the governing physics, the dependency may be complicated and involve time-delayed responses mostly due to complex poisoning effects. In this sense the actuating space may be regarded as a 'primary' space, and the state space may be regarded as a dependent 'secondary' space.

Nevertheless, a simple and well-known reactivity balance equation (in case of constant reactor power $\Sigma\rho=0$) allows to predict the trajectories Ts of the state variables of a nuclear reactor on the basis of given trajectories Ta of the actuating variables for a certain time span, for example for the next 24 hours. In other words, for a given trajectory Ta in the actuating space the according trajectory Ts in the state can, in principle, be predicted with the help of a simple predictor module based on a reactivity balance equation.

Besides well-known control of average coolant temperature (ACT), the task of reactor control includes plenty of other aspects as operational safety permitting operation only within given limits, uniforming of burnup, burnup compensation, compensation of the poisoning, uniforming of power density distribution, support of flexible electricity production, operation economy, etc. Therefore, the number of control goals is usually much greater than the number of actuating variables. This aspect, in connection with the already mentioned nonlinearity and complex dynamics of the system to be controlled, as well as enormous wideness of different acting time scales beginning from 10 µs for prompt neutrons, over seconds for delayed neutrons and heat transfer processes, over dozens of hours for poisoning effects up to years for fuel depletion renders conventional control theory inappropriate. Even special methods like Multiple-Input Multiple-Output (MIMO) appear inappropriate.

To overcome the above-mentioned problems, the present disclosure proposes a totally different approach based on the trajectory representation explained above, employing numerical calculus of variations.

In summary, the governance scheme according to the present disclosure comprises iteratively considering a large number of randomly varied possible trajectories Ta of a number of actuating variables for a preset future large time interval (order of magnitude 24 hours), preferably under the constraint of a given reactor power schedule, wherein each trajectory Ta of actuating variables is assigned a figure of merit $\Sigma$ on the basis of a Value Table which contains weighting or penalty values for a number of events or adverse reactor core states which are characterized by preset conditions or values of the actuating variables, the process variables and/or variables derived from them. The actual trajectory Ta of actuating variables used for setting the according actuators is then chosen such that the figure of merit $\Sigma$ has a local extremum.

Figure 2:
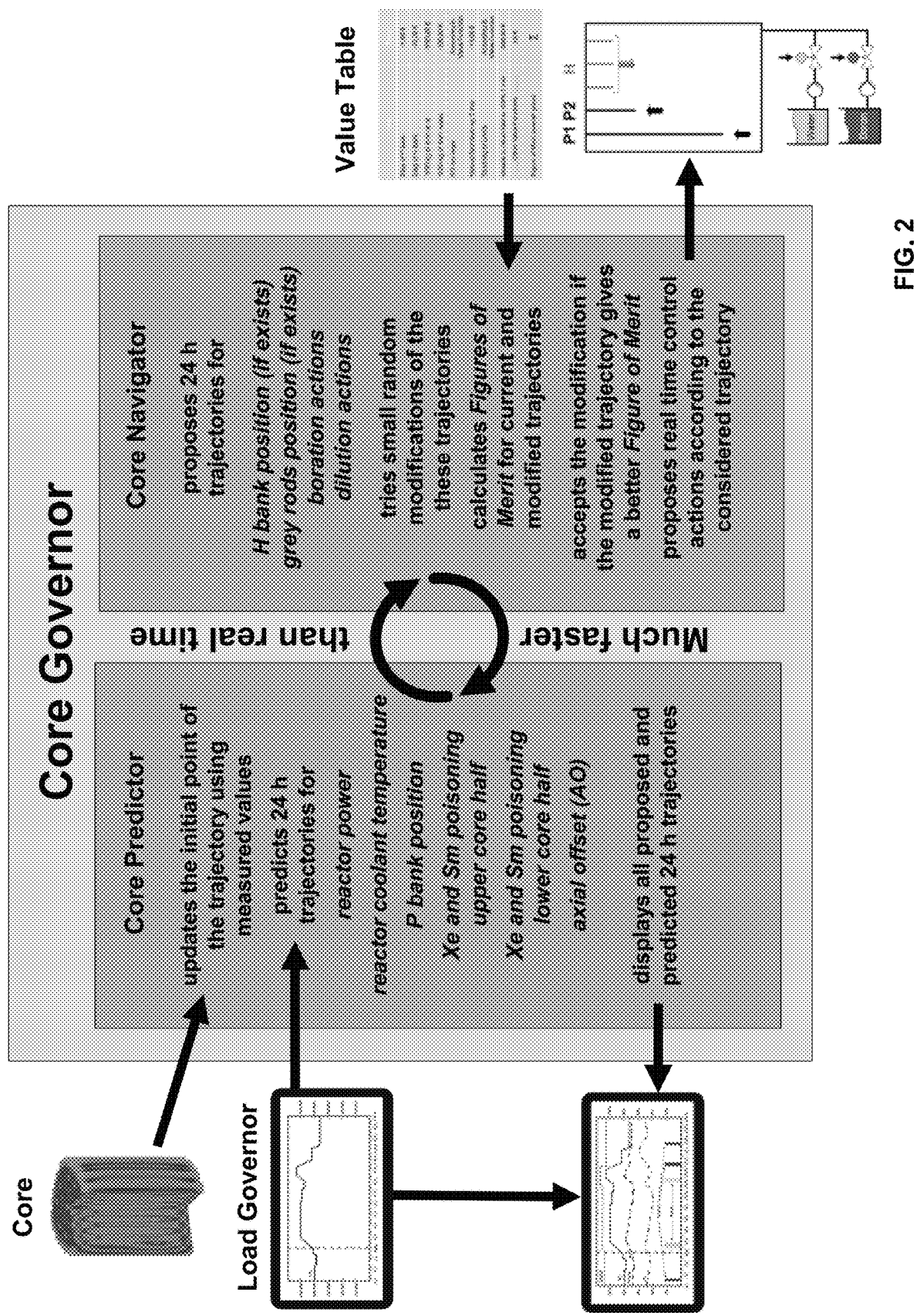
FIG. 2 provides a schematic overview of a governing algorithm for the function 'Core Governor' according to the present disclosure.
Figure 10:
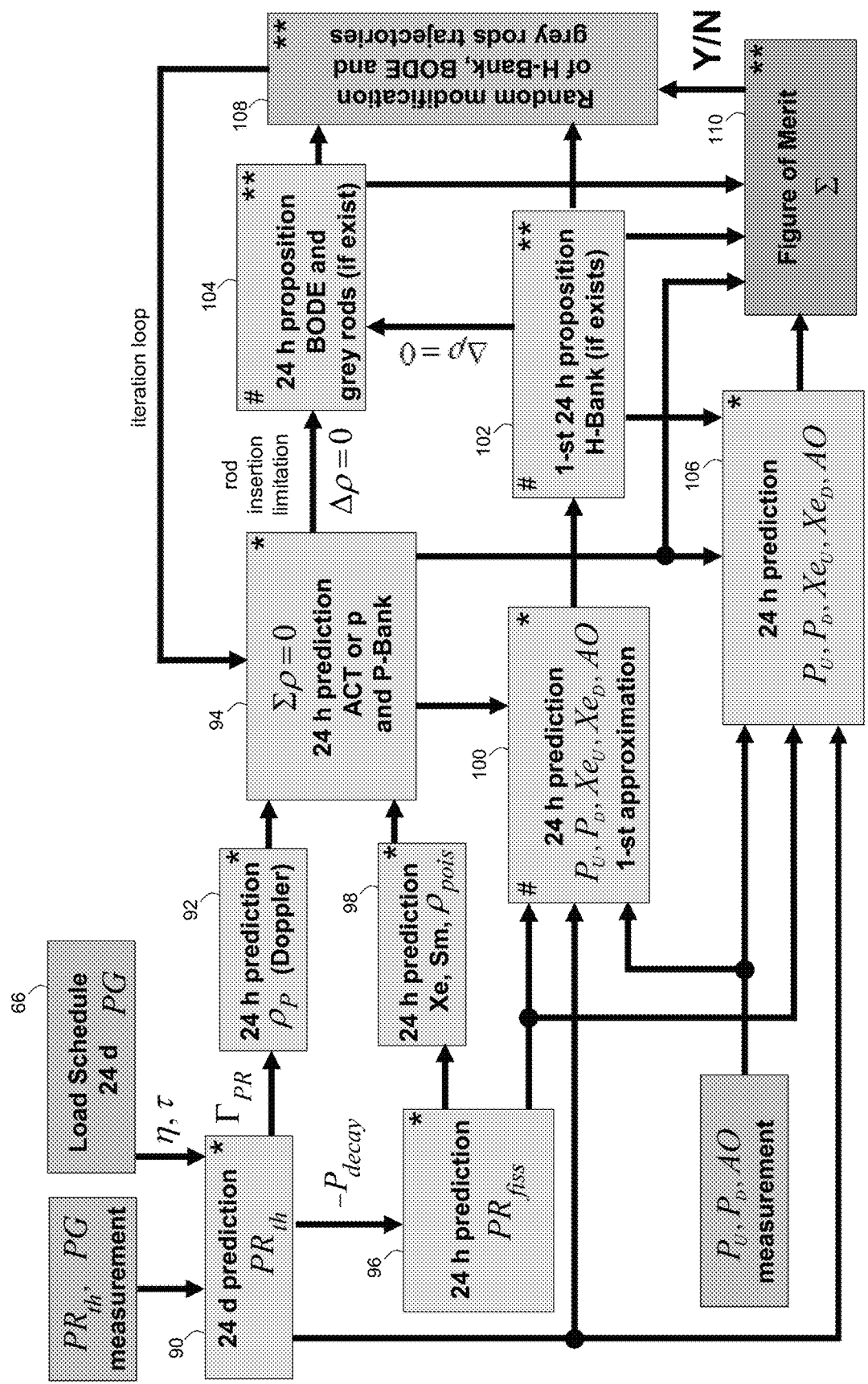
FIG. 10 shows a flow diagram for a preferred algorithm for the 'Core Governor' according to FIG. 2.

This general working principle of the Core Governor 68 according to the present disclosure is schematically visualized in FIG. 2 for the present embodiment of the nuclear reactor 2 shown in FIG. 1, and FIG. 10 shows the preferable algorithm for the Core Governor 68.

The Core Governor 68 comprises a module called Core Predictor which—for a given set of current values of the state variables, a given Load Schedule for electrical power for the next 24 hours (received from Load Governor 66) and on trajectories of the H-bank (proposed by Core Navigator)—predicts trajectories Ts of the state variables and possibly other variables derived from them for a given future time frame, for example the next 24 hours. In particular, besides the already mentioned state variables thermal reactor power PR, axial offset AO, and reactor coolant temperature ACT the temporal development of other variables may be derived and predicted. Using a reactivity balance equation, the trajectory of the P-bank can be predicted. Furthermore, the Core Predictor predicts the integral concentration and spatial distribution of reactor poisons like Xenon (Xe) and Samarium (Sm) within the reactor core 6 which significantly affect the reactor core reactivity. In summary, the Core Predictor derives a corresponding trajectory Ts of state variables and P-bank position from a given Load Schedule, calculated poisoning, and proposed trajectories Ta for the slow actors as boron concentration and positions of movable H-bank (if exists) and grey rods (if exist).

Furthermore, the Core Governor 68 comprises a module called Core Navigator. Core Navigator is responsible for the proposition for and optimization of the trajectories of slow actuators: boron concentration, H-Bank (if exists) and grey rods (if exist), having certain degree of freedom.

Core Navigator is able to assess the current trajectory by assigning a single figure of merit $\Sigma$ to it, considering the current trajectory Ta of actuating variables and the according trajectory Ts of state variables, taking into account the reactor poisoning. This assignment is based on a Value Table, an exemplar of which is shown in FIG. 6. The Value Table contains weighting or penalty values for a number of events or adverse reactor core states which are characterized by preset conditions or values of the actuating variables, the process variables and/or variables derived from them. In this context, the term 'condition' or 'value' is to be understood in a broad sense.

For reasons of clearness and descriptiveness, the respective penalty value, a scalar quantity, may be given as a monetary value, for example as a price in Euro (€) (FIG. 6). In particular, the number of bank movements shall be minimized, and thus each bank step may be assigned a certain value. Similarly, borating and diluting actions by the BODE system are assigned penalty values. Even more important, certain parameters or variables, derivable from the state variables and/or the actuating variables, must not exceed given bands (minimum and/or maximum values given by reactor protection and reactor limitation systems) for reasons of operational safety. Hence, the passing of given boundaries or (pre-) limits (which might be adjusted dynamically) and similar events are assigned relatively high penalty values.

Figure 7:
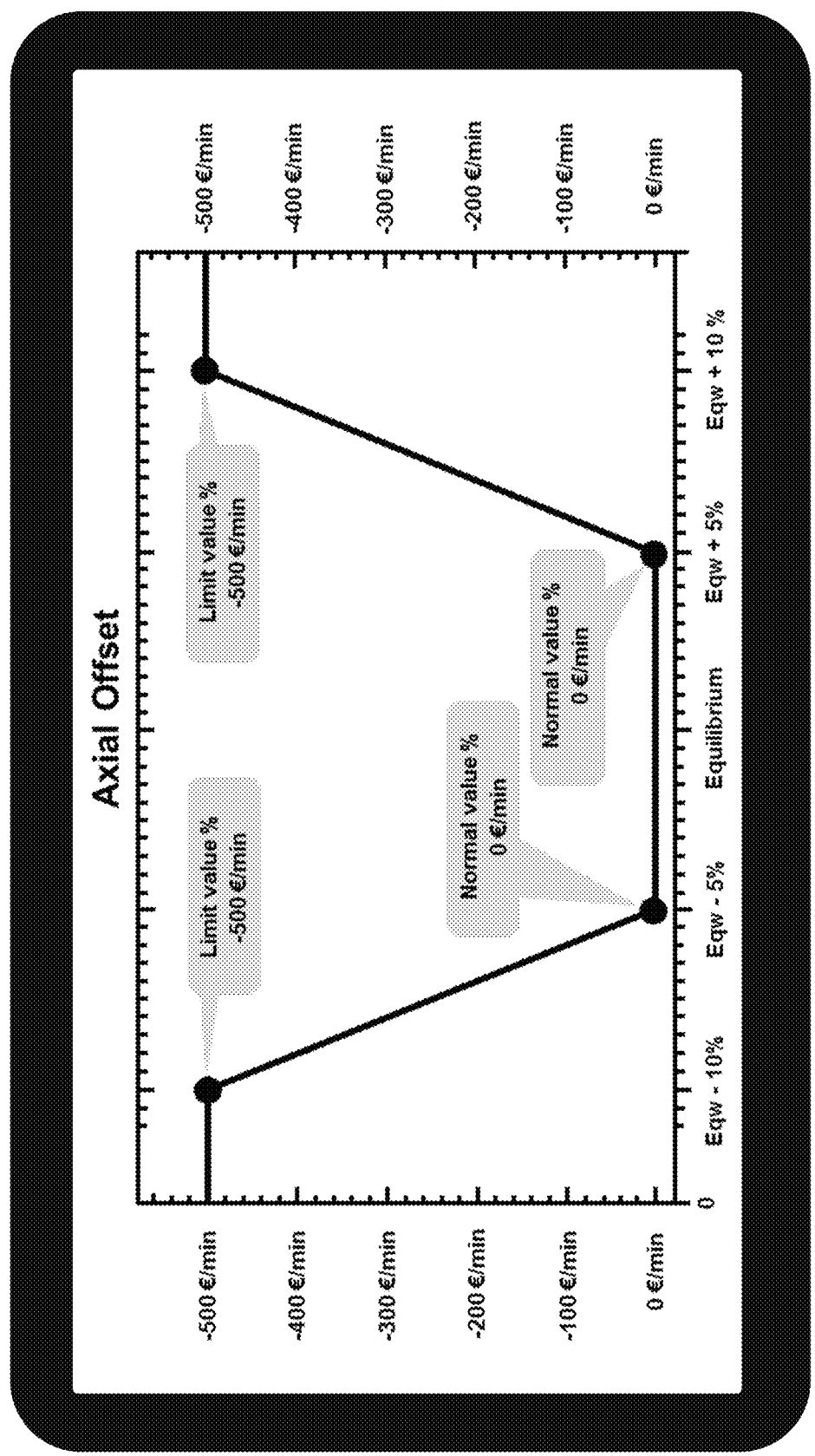
FIG. 7 shows an example Value Function for use in the Value Table according to FIG. 6.
Figure 8:
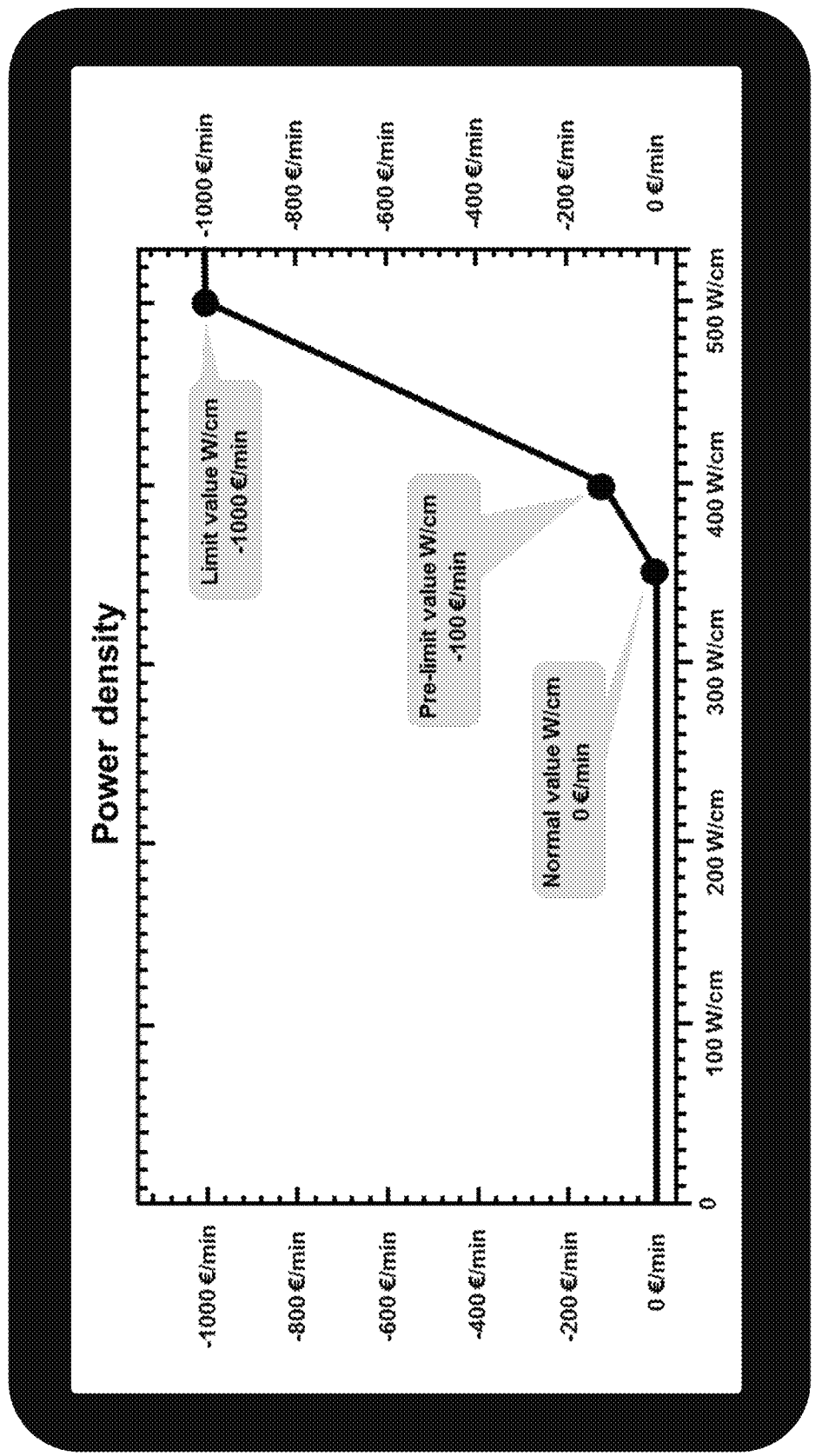
FIG. 8 shows another example Value Function for use in the Value Table according to FIG. 6.

FIGS. 7 and 8 show some examples for such preset conditions. FIG. 7 shows the penalty for large AO: penalty value is a preset function of AO. The vertices can be preset using the keyboard and/or mouse of operator station. FIG. 8 shows the penalty for large power density. The vertices here can be preset manually or are continually received from the reactor limitation system. Single contributions for the figure of merit can also depend on dynamical limits generated by the reactor limitation system. The trajectories for such dynamic limits can be calculated by the Core Predictor.

Of course, the given list of penalty values shown in FIG. 6 and penalty functions shown in FIGS. 7 and 8 are only exemplary. In general, the list may get expanded and/or amended. In this case, the figure of merit algorithm should also be adapted. Since the figure of merit $\Sigma$ (overall price) preferably is the simple sum of the individual penalty values (individual prices), this adaptation is trivial.

The Core Navigator varies the trajectories for boration/dilution, and the moves of H-Bank (if exists) and grey rods (if exist) cyclic using a random generator. Since boration and dilution as well as rod movements are discrete events (see FIG. 9), the modifications of them can look like a time shift of 'ON' and 'OFF' fronts of these actions as well as random changing of corresponding amplitudes. Core Navigator can also try to delete some action, or to create a new one, to split existing action in two actions of smaller amplitude or duration separated by certain time span, or to merge two neighbor actions in a single one. In each such iteration cycle the Core Predictor corrects the trajectory of the P-Bank accordingly and calculates the trajectories for the reactor state variables Ts. Again, in each iteration step the Core Navigator calculates and assigns a single figure of merit $\Sigma$ to thus-modified trajectory. The Core Navigator accepts the modification if the modified trajectory gives a better figure Σ of merit than the current one. In this case, the modified trajectories substitute the current ones. Otherwise, the modification is discarded, and a new random variation of the current trajectory is tried.

Figure 9:
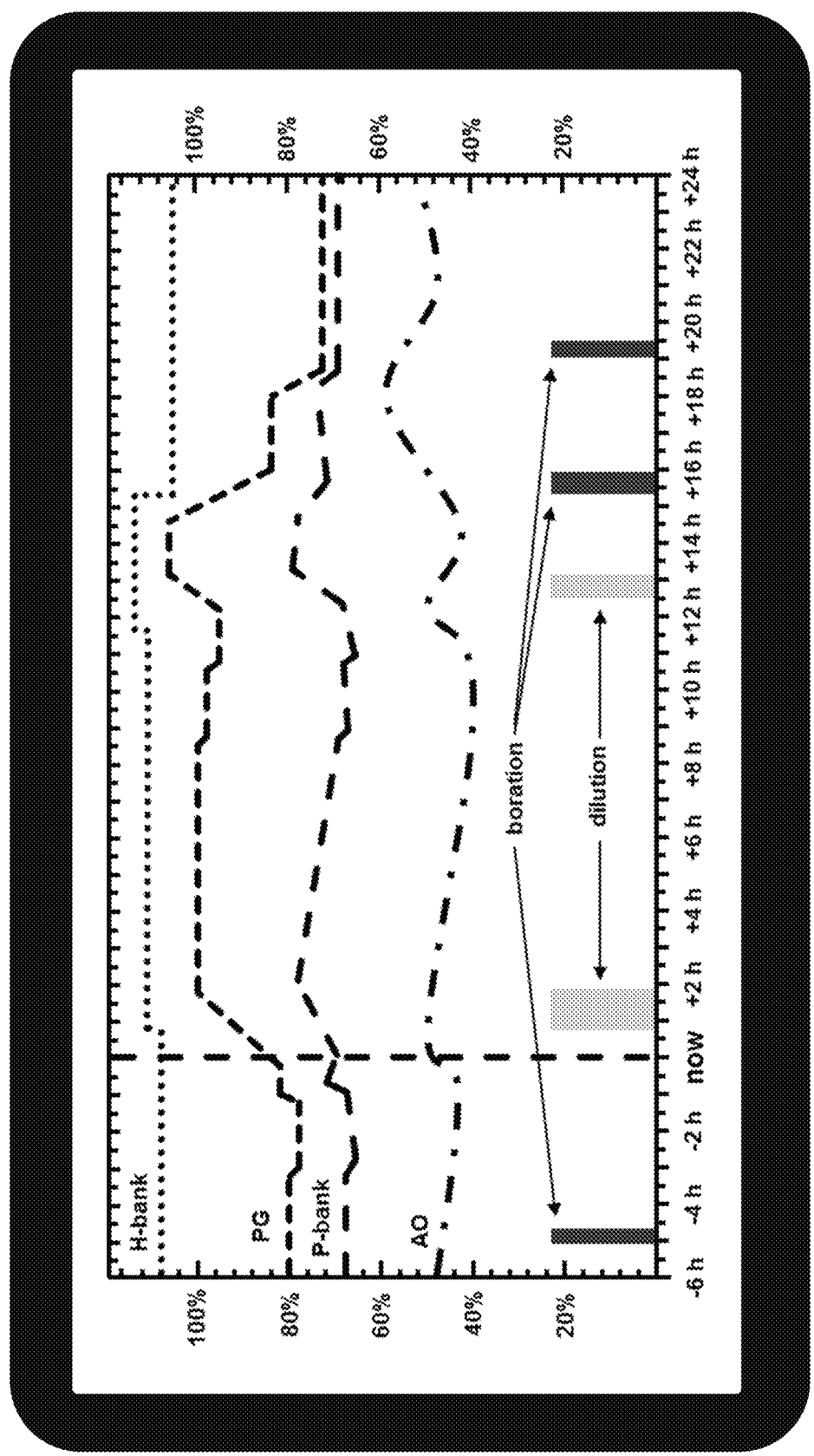
FIG. 9 is an exemplary output screen shown on a display of the 'Core Governor' according to FIG. 2.

Generally speaking, the actual trajectories for boration/dilution, and the moves of H-Bank (if exists) and grey rods (if exist) are chosen such that the figure of merit Σ has a local extremum. This optimization algorithm runs all the time cyclic in background making thousands of iterations per second and appears for the operator on the screen 82 of the Core Governor 68 as a continuously slowly changing picture (FIG. 9).

In parallel with the fast optimization process described above and running with maximum possible speed in background, the so-called real time process runs. The real time process runs preferably with the time step of 200 ms and shifts all trajectories on the operator screen 82 according to FIG. 9 to the left. Each 200 ms all the trajectories are shifted by 200 ms to the left, the time scale on the horizontal axis remains immobile. The running time appears for the operator as slow continues creep of all trajectories to the left. Through this slow creep, the actions like boration/dilution as well as H-Bank (if exists) and grey rods (if exist) moves, proposed by Core Navigator, will some time reach the 'now' line. At that moment the corresponding actions will be proposed for execution. The execution can be performed manually, semiautomatic (permission button) or fully automatic. Simultaneously the starting points (t=0) of all trajectories will be updated using measured values of reactor power PR, coolant temperature ACT and Axial Offset AO. The screen segment to the left from the 'now' line shows measured values from the past. If in manual or semiautomatic mode the proposed actions will be ignored by the operator, the Core Predictor will promptly update all the trajectories accordingly, its standard algorithm described above is enough for it, no special algorithm is needed. Similarly, the Load Schedule can be updated anytime by grid operator or by plant operator. The above described algorithm is enough to cope with such redispatch, no additional algorithm is needed. Ditto for the possible manual change of the Value Table during the operation; the above described algorithm is enough by itself to cope with such change.

To summarize, instead of trying to solve the ambitious and mathematically overdetermined control problem of finding a control action which transfers the nuclear reactor from state A to state B under various constraints (inverse problem), the method according to the present disclosure iterates the according direct problem many times by trying randomly modified control actions and choosing the one assigned the highest/lowest (depending on definition and sign) figure of merit.

In other words, the Core Governor 68 considers possible trajectories Ta of actuating variables (like rod movements, borating and dilution actions) for a given optimization time frame, for example the next 24 hours, calculates the figure of merit Σ for each possible trajectory Ta. Modifying and iterating the trajectories Ta, the Core Governor 68 looks for the best trajectory Ta giving the highest/lowest figure of merit Σ, displays this best-found trajectory Ta, preferably together with the corresponding state trajectory Ts, and proposes control actions in real time. The figure of merit Σ can therefore be regarded as a quantified overall value of combined disadvantages, automatically weighting or balancing them. The working principle belongs to the area of artificial intelligence and is similar to the one underlying street navigators or chess computers.

The system is preferably complemented with suitable input and out devices. A sample output screen of the Core Governor 68, shown in FIG. 9, displays trajectories Ts for state variables predicted for the next 24 hours by the Core Predictor and trajectories Ta for actuators proposed by the Core Navigator.

In the following section some implementation details, which also cover the initialization of the system, are disclosed for a specific embodiment based on FIGS. 1 and 2.

The preferable algorithm is shown in FIG. 10.
1. The prediction starts with the Load Schedule of FIG. 5 giving electrical power as a function of time preferably for the next 24 hours. The Load Schedule comes from the grid operator 22 and will be stored in Load Governor 66. The Load Schedule can anytime be redispatched by grid operator, after the release of possible changes by plant operator it will be valid for operation. If the grid operator does not provide the plant operator with the Load Schedule, the plant operator can compile his own 'best estimate plan'. Even a very rough plan, whether the electrical output will decrease, increase or stay constant in the next 24 hours is useful.
2. Using the Load Schedule and taking into account the efficiency of the plant η and the delay between thermal power and electrical power τ, Core Predictor Module 90 calculates the trajectory for the reactor thermal power $PR_{th}$ for the next 24 hours. The predictor module 92 predicts the trajectory for power reactivity (Doppler) $\rho_P = \Gamma_{PR} \cdot PR_{th}$.
3. Predictor module 96 calculates the trajectory for the fission power and fission rate: $PR_{fiss} = PR_{th} - P_{decay}$, $R_{fiss} = P_{fiss}/E_{fiss}$.
4. Using the trajectory for fission rate, the module 98 calculates the trajectories for Xe and Sm concentration and their reactivity $\rho_{poison}$.
5. Using the trajectories for power reactivity $\rho_P$ and $\rho_{poison}$ reactivity and taking into account ACT, which is controlled by the ACT controller 48 with known characteristic, the predictor module 94 calculates the trajectory for the P-bank. This calculation is based on the reactivity balance equation $\Sigma\rho=0$.
6. If some parts of so calculated trajectory of P-bank leave the band, permitted by rod insertion limitation system (for future time period predicted trajectories for the limits should be used), the module 104 substitutes the rod movement by boration/dilution or by insertion/withdrawn of grey rods for corresponding time intervals using the reactivity balance equation $\Sigma\rho=0$. If the ability of fast power rise to 100% is desired, it can be guaranteed by the limitation of P-bank withdrawn. In this case a special module calculates the trajectory for the reactivity of the P-bank needed for the fast power rise from the current power to 100% and limit the withdrawn of P-bank accordingly. The 100% power rise guarantee can be activated for the whole interval of prediction, or for a part of it.
7. Based on the trajectories for reactor thermal power $PR_{th}$, reactor fission power $PR_{fiss}$ as well as P- and H-bank positions the 1-st approximation trajectories for thermal power in the upper half and downer half of the core $P_U$, $P_D$, axial offset AO and 2-point distribution of reactor poisons $Xe_U$, $Xe_D$, $Sm_U$, $Sm_D$ will be calculated by the module 100. This 1-st approximation is needed only for the initialization of the trajectories. During the further cyclical operation this intermediate calculation will be dropped.
8. Using the first approximation for the trajectory of axial offset AO calculated by module 100, the module 102 of Core Navigator makes the first proposition for the trajectory of H-bank. This 1-st approximation is needed only for the initialization of the trajectories. During the further cyclical operation this intermediate calculation will be dropped.
9. The module 104 updates the trajectory for boration, dilution and grey rods insertion taking into account the 1-st approximation of H-Bank trajectory calculated by module 102. This update is needed only for the initialization of the trajectories. During the further cyclical operation this intermediate calculation will be dropped.
10. Based on the trajectories for reactor thermal power $PR_{th}$, reactor fission power $PR_{fiss}$ as well as P- and H-bank positions the trajectories for thermal power in the upper half and downer half of the core $P_U$, $P_D$, axial offset AO and 2-point distribution of reactor poisons $Xe_U$, $Xe_D$, $Sm_U$, $Sm_D$ will be calculated by the module 106.

Now all trajectories are initialized, a modification process can start. First modification routine is update to the running time.
1. In each update cycle of preferably 200 ms all trajectories will be shifted by 200 ms to the left. The origins of measurable process variables and actuating variables will be updated according to the current measured values.
2. The modules 90, 92, 96, 98, 94 and 106 will be called to update corresponding trajectories according to currently measured process variables and P-bank position.

Second modification routine aims to optimization of the trajectories for H-Bank, boration, dilution and grey rods and runs permanent in background. It is a fast, non-real time cyclic routine running as fast as possible making preferably 100 optimization cycles every second.
1. The module 108 of Core Navigator makes small random modifications of the trajectories of H-Bank, boration, dilution and grey rods. Since boration and dilution as well as rod movements are discrete events (see FIG. 9), the modifications of them can look like a random time shift of 'ON' and 'OFF' fronts of these actions as well as random changing of corresponding amplitudes. Core Navigator can also try to delete some action, or to create a new action, to split existing action in two actions of smaller amplitude or duration separated by certain time span, or to merge two neighbor actions in a single one.
2. The module 94 updates the trajectory of P-bank using the reactivity balance equation $\Sigma\rho=0$ and the module 106 updates the trajectories for $P_U$, $P_D$, AO and $Xe_U$, $Xe_D$, $Sm_U$, $Sm_D$.
3. The module 110 calculates the figures of merit for the current and for the modified trajectory sets using the Value Table of FIG. 6. If the modified trajectory yields a better figure of merit as the current one, the current trajectory will be substituted by the modified one, if not, the modification will be discarded. After that a new modification attempt will be started.

A redispatch action leads to discrete modification of the Load Schedule. The module 90 is able to reshape its current effective trajectory for the electrical power slowly and continuously to the new one. Such transformation can take few minutes starting from the current trajectory and reshaping it continuously to the new request of Load Governor. This slow transformation allows both cyclic running routines to reform all trajectories without introducing additional special algorithms.

There exists also an alternative possibility to initialize the trajectories. Directly after the power-up or reset of the Core Governor 68 a steady state for all trajectories for the next 24 24 hours will be assumed (constant trajectories according to the currently measured state and acting variables) and both cyclic routines will be started. The slow reshaping of the effective trajectory for the electrical power by module 90 while running cyclic routings will reshape all trajectories. In this case the trajectories for H-Bank, boration, dilution and grey rods will not be explicitly initialized but created in a gazillion random actions of the module 108. In this case the modules 100, 102 and 104 can be dropped.

Due to running time and consequent creep of all the trajectories to the left (FIG. 9), the actions like boration/dilution as well as H-Bank (if exists) and grey rods (if exist) movements, proposed by Core Navigator, will some time reach the 'now' line. At that moment the corresponding actions will be proposed for execution. The execution can be performed manually, semiautomatic (permission button) or fully automatic.

If in manual or semiautomatic mode the proposed actions will be discarded by the operator, the Core Predictor will quickly update all the trajectories accordingly, its standard algorithm described above is enough for it, no special algorithm is needed.

The so calculated overall planning for the next 24 hours including all trajectories of state variables, acting variables and the overall figure of merit is displayed on the screen 82 of Core Governor 68 the whole time. The picture creeps slowly to the left and continuously improves itself. Figure of merit will be also displayed and illustrates this continues improvement.

Besides its main function the Core Governor enables to study the possibilities of the power plant concerning flexible operation for the next 24 hours. For this purpose, one can tentatively change the Load Schedule on the screen of Load Governor moving the vertices of the plot by mouse. In a few seconds or minutes, depending on the computer performance one can observe the impact of this tentative change on all trajectories describing all state variables.

LIST OF REFERENCE NUMERALS

2 pressurized water reactor (PWR)
4 nuclear power plant
6 reactor core
8 reactor pressure vessel
10 primary cooling circuit
12 reactor coolant pump
14 steam generator
16 secondary cooling circuit
18 steam turbine
20 electrical generator
22 power grid
24 condenser
26 feedwater pump
28 feedwater tank
30 turbine valve
32 steam feed line
34 bypass line
36 bypass valve
40 turbine controller
42 bypass controller 44 control rods
46 neutron flux controller
48 average cooling temperature (PWR, DWR) or live steam pressure (WWER) controller
50 ex-core instrumentation
52 feed pump
54 feed pump
56 control valve
58 control valve
64 BODE controller
66 Load Governor
68 Core Governor
70 in-core instrumentation
80 screen of the Load Governor
82 screen of the Core Governor
90 Predictor module for the reactor thermal power
92 Predictor module for power (Doppler) reactivity
94 Predictor module for average coolant temperature and position of P-bank
96 Predictor module for fission power
98 Predictor module for reactor poisoning (Xe, Sm)
100 1-st Predictor module for the power density and poison density in the reactor core
102 Navigator module for the first proposition of the H-bank position
104 Navigator module for BODE and grey rods
106 2-nd Predictor module for the power density and poison density in the reactor core
108 Navigator module randomizing the trajectories for H-Bank, BODE and grey rods
110 Navigator module calculating figure of merit
ACT Average Coolant Temperature
AO Axial Offset
BODE BOric acid/DEmineralized water
DWR DruckWasserReaktor (German)
PR Reactor Power
PWR Pressurized Water Reactor
Ta trajectory of actuating variables
Ts trajectory of state variables
WWER Water-Water Energetic Reactor (Soviet PWR)
Σ figure of merit

What is claimed is:

1. A method for governing a pressurized water nuclear reactor, the pressurized water nuclear reactor comprising a reactor core and a cooling circuit for the reactor core holding a reactor coolant, a reactor state represented by measurable state variables, and a reactor core reactivity being controlled by actuating variables, the actuating variables including at least a first actuating variable and a second actuating variable, the first actuating variable being positions of control rods and the second actuating variable being a position or positions of at least one feed pump and/or at least one control valve for controlling a boron concentration in the cooling circuit, the method comprising:

measuring current values of the measurable state variables;

receiving, by a core governor, a load schedule giving a future electrical power demand as a function of time;

iteratively considering, by the core governor and for a future time interval of the future electrical power demand, a number of randomly varied possible trajectories of the first and second actuating variables under constraint of the received Load Schedule, predicting, for each possible combination of the trajectories of the first and second actuating variables, trajectories for the measurable state variables on the basis of each of the possible combinations of the trajectories of the first and second actuating variables, the measured current values of the measurable state variables, calculated poisoning values and a reactivity balance equation of the reactor core reactivity, wherein each of the possible combinations of the trajectories of the first and second actuating variables is assigned a figure of merit on the basis of a Value Table which contains weighting or penalty values for a number of events or adverse reactor core states of the reactor state, wherein the weighting or penalty values are based on:

preset conditions or values of the actuating variables, the measurable state variables, and/or variables derived from the preset conditions or values of the actuating variables, and/or the measurable state variables, wherein a chosen combination of trajectories of the first and second actuating variables from amongst the possible combinations of the trajectories of the first and second actuating variables having a highest or lowest corresponding figure of merit is chosen by the core governor; and moving actuators of the nuclear reactor to achieve the chosen combination of the trajectories of the first and second actuating variables to move the positions of the control rods with respect to the reactor core to change the reactivity of the core and/or to move the position or the positions of the at least one feed pump and/or the at least one control valve to change the boron concentration in the primary cooling circuit.

2. The method according to claim 1, wherein the measurable state variables comprise one or several of: thermal reactor power, reactor coolant temperature, live steam pressure and/or axial offset of a reactor core power density.

3. The method according to claim 1, wherein the control rods are consolidated into a plurality of control banks.

4. The method according to claim 1, wherein the measured current values of the measurable state variables are updated in real-time.

5. The method according to claim 1, wherein the randomly varied possible trajectories of the first and second actuating variables for the future time interval are varied using a random number generator.

6. The method according to claim 1, wherein the future time interval is larger than one hour.

7. The method according to claim 6, wherein the future time interval has an order of magnitude of 24 hours.

8. A governance system for governing a pressurized water nuclear reactor, the pressurized water nuclear reactor comprising a reactor core and a cooling circuit for the reactor core holding a reactor coolant, a reactor state represented by measurable state variables, and a reactor core reactivity being controlled by actuating variables, the actuating variables including at least a first actuating variable and a second actuating variable, the first actuating variable being positions of control rods and the second actuating variable being a position or positions of at least one feed pump and/or at least one control valve for controlling a boron concentration in the cooling circuit, the governance system including a computer programmed for executing the following steps:

receiving measured current values of the measurable state variables;

receiving a load schedule giving a future electrical power demand as a function of time;

iteratively considering, for a future time interval of the future electrical power demand, a number of randomly varied possible trajectories of the first and second actuating variables under constraint of the received Load Schedule, predicting, for each possible combination of the trajectories of the first and second actuating variables, trajectories for the measurable state variables on the basis of each of the possible combinations of the trajectories of the first and second actuating variables, the measured current values of the measurable state variables, calculated poisoning values and a reactivity balance equation of the reactor core reactivity, wherein each of the possible combinations of the trajectories of the first and second actuating variables is assigned a figure of merit on the basis of a Value Table which contains weighting or penalty values for a number of events or adverse reactor core states of the reactor state, wherein the weighting or penalty values are based on:

preset conditions or values of the actuating variables, the measurable state variables, and/or variables derived from the preset conditions or values of the actuating variables, and/or the measurable state variables, wherein a chosen combination of trajectories of the first and second actuating variables from amongst the possible combinations of the trajectories of the first and second actuating variables having a highest or lowest corresponding figure of merit is chosen by the computer; and instructing actuators of the nuclear reactor to achieve the chosen combination of the trajectories of the first and second actuating variables by moving the positions of the control rods with respect to the reactor core to change the reactivity of the core and/or moving the position or the positions of the at least one feed pump and/or the at least one control valve to change the boron concentration in the primary cooling circuit.

* * * * *